US012042807B2

(12) United States Patent
Shade et al.

(10) Patent No.: US 12,042,807 B2
(45) **Date of Patent: *Jul. 23, 2024**

(54) HANDHELD SHOWERHEAD WITH PUSH-BUTTON RELEASE MECHANISM

(71) Applicant: Homewerks Worldwide, LLC, Lake Bluff, IL (US)

(72) Inventors: Rob Shade, Aurora, OH (US); Viorel Berlovan, Jr., Medina, OH (US)

(73) Assignee: HOMEWERKS WORLDWIDE, LLC, Lake Bluff, IL (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/636,377

(22) PCT Filed: May 11, 2021

(86) PCT No.: PCT/US2021/031738
§ 371 (c)(1),
(2) Date: Feb. 18, 2022

(87) PCT Pub. No.: WO2021/242513
PCT Pub. Date: Dec. 2, 2021

(65) Prior Publication Data

US 2022/0266287 A1 Aug. 25, 2022

Related U.S. Application Data

(60) Provisional application No. 63/031,728, filed on May 29, 2020.

(51) Int. Cl.
*E03C 1/04* (2006.01)
*B05B 15/62* (2018.01)

(52) U.S. Cl.
CPC ............ *B05B 15/62* (2018.02); *E03C 1/0408* (2013.01)

(58) Field of Classification Search
CPC ......... B05B 15/62; B05B 1/18; E03C 1/0408; E03C 1/0409; E03C 1/06
See application file for complete search history.

(56) References Cited

U.S. PATENT DOCUMENTS 3,865,310 A 2/1975 Elkins et al.
6,446,278 B1 9/2002 Lin
(Continued)

FOREIGN PATENT DOCUMENTS

CN 2474231 Y 1/2002
CN 2520207 Y 11/2002
(Continued)

OTHER PUBLICATIONS

International Search Report and Written Opinion, dated Dec. 14, 2020, in connection with PCT/US2020/058792, filed Nov. 4, 2020.
(Continued)

*Primary Examiner* — Qingzhang Zhou
(74) *Attorney, Agent, or Firm* — Cozen O'Connor

(57) ABSTRACT

A handheld showerhead assembly including a handheld showerhead and a receiver to which the handheld showerhead is releasably securable. The handheld showerhead includes a push-button on a handle portion thereof for releasing the handheld showerhead from the receiver. The handheld showerhead is maintained securely engaged with the receiver until the push-button is depressed to permit removal of the handheld showerhead from the receiver. Cooperating magnetic components attract the handheld showerhead to the receiver.

7 Claims, 12 Drawing Sheets

(56) References Cited

U.S. PATENT DOCUMENTS

| | | | |
|---|---|---|---|
| 6,594,832 B2 | 7/2003 | Yang | |
| 7,665,676 B2 | 2/2010 | Lev | |
| 7,753,079 B2 | 7/2010 | Nelson | |
| 7,793,987 B1 | 9/2010 | Busch et al. | |
| 7,837,133 B2 | 11/2010 | Zhou | |
| 7,909,061 B2 | 3/2011 | Nelson | |
| 8,387,661 B2 | 3/2013 | Nelson | |
| 8,413,686 B2 | 4/2013 | Ko | |
| 8,567,430 B2 | 10/2013 | Allen et al. | |
| 9,410,309 B2 | 8/2016 | Sharratt et al. | |
| 9,438,977 B2 | 9/2016 | Wang et al. | |
| 9,849,471 B2 | 12/2017 | Lin et al. | |
| 9,919,331 B2 * | 3/2018 | Scheffer | E03C 1/06 |
| 10,046,340 B2 | 8/2018 | Lin et al. | |
| 10,046,341 B2 | 8/2018 | Wu et al. | |
| 10,060,105 B2 | 8/2018 | Lin et al. | |
| 10,150,121 B2 | 12/2018 | Lin et al. | |
| 10,399,094 B2 | 9/2019 | Huffington et al. | |
| 10,500,596 B2 | 12/2019 | Lin et al. | |
| 10,533,309 B2 | 1/2020 | Genord et al. | |
| 10,618,065 B2 | 4/2020 | Lin et al. | |
| 10,695,786 B2 | 6/2020 | Mercado | |
| 10,821,449 B2 | 11/2020 | Lin et al. | |
| 11,247,223 B2 * | 2/2022 | Huang | B05B 15/68 |
| 2003/0041372 A1 | 3/2003 | Yang | |
| 2006/0130229 A1 | 6/2006 | Kollmann et al. | |
| 2007/0022528 A1 | 2/2007 | Gilbert | |
| 2009/0007330 A1 | 1/2009 | Genord et al. | |
| 2010/0043135 A1 | 2/2010 | Patterson et al. | |
| 2010/0170587 A1 | 7/2010 | Kaess | |
| 2013/0219613 A1 | 8/2013 | Ojea | |
| 2013/0299608 A1 | 11/2013 | Spangler et al. | |
| 2013/0320116 A1 | 12/2013 | Jonte et al. | |
| 2015/0122913 A1 | 5/2015 | Wang et al. | |
| 2016/0236223 A1 | 8/2016 | Scheffer et al. | |
| 2017/0014849 A1 | 1/2017 | Gao et al. | |
| 2017/0259279 A1 | 9/2017 | Lin et al. | |
| 2018/0193851 A1 | 7/2018 | L'Henaff et al. | |
| 2019/0176170 A1 | 6/2019 | Lee et al. | |
| 2020/0109542 A1 | 4/2020 | Mavinahally et al. | |
| 2020/0122166 A1 | 4/2020 | Farley | |
| 2020/0238306 A1 | 7/2020 | Su et al. | |
| 2020/0360947 A1 | 11/2020 | Guthrie et al. | |

FOREIGN PATENT DOCUMENTS

| | | | |
|---|---|---|---|
| CN | 202238465 | U | 5/2012 |
| CN | 202343352 | U | 7/2012 |
| CN | 102873000 | A | 1/2013 |
| CN | 103551272 | | 2/2014 |
| CN | 203470251 | U | 3/2014 |
| CN | 203525935 | U | 4/2014 |
| CN | 203960964 | U | 11/2014 |
| CN | 204703237 | U | 10/2015 |
| CN | 204724343 | | 10/2015 |
| CN | 105750101 | A | 7/2016 |
| CN | 106122534 | A | 11/2016 |
| CN | 106269322 | | 1/2017 |
| CN | 107260038 | A | 10/2017 |
| CN | 107747336 | A | 3/2018 |
| CN | 107812623 | A | 3/2018 |
| CN | 207295860 | | 5/2018 |
| CN | 207970997 | U | 10/2018 |
| CN | 110144999 | | 8/2019 |
| CN | 209808145 | U | 12/2019 |
| CN | 209866365 | U | 12/2019 |
| CN | 210125489 | U | 3/2020 |
| CN | 210357616 | U | 4/2020 |
| CN | 111167652 | A | 5/2020 |
| CN | 210631123 | U | 5/2020 |
| CN | 111604203 | A | 9/2020 |
| CN | 211613129 | U | 10/2020 |
| DE | 199300418 | U1 | 5/1993 |
| DE | 102007011601 | A1 | 9/2008 |
| EP | 2096215 | B1 | 4/2015 |
| EP | 3309306 | B1 | 10/2019 |
| JP | 2080173 | U | 6/1990 |
| JP | 9075253 | A | 3/1997 |
| JP | 2003088480 | A | 3/2003 |
| JP | 2003245217 | A | 9/2003 |
| KR | 20100065848 | A | 6/2010 |
| KR | 484447 | Y1 | 9/2017 |
| WO | WO 2008107101 | A1 | 9/2008 |
| WO | WO 2008107102 | A1 | 9/2008 |
| WO | WO 2008107103 | A1 | 9/2008 |
| WO | WO 2009019491 | | 2/2009 |
| WO | WO 2020/072368 | | 4/2020 |

OTHER PUBLICATIONS

International Preliminary Report on Patentability, dated Nov. 20, 2021, in connection with PCT/US2020/058792, filed Nov. 4, 2020.

International Search Report and Written Opinion, dated Jul. 7, 2021, in connection with PCT/2021/031738, filed May 11, 2021.

Office Action dated Jan. 17, 2024, issued in Chinese Patent Application No. 202080070774.5.

* cited by examiner

HANDHELD SHOWERHEAD WITH PUSH-BUTTON RELEASE MECHANISM

CROSS REFERENCE TO RELATED PATENTS AND APPLICATIONS

The present application claims priority to U.S. Provisional Patent Application Ser. No. 63/031,728, filed on May 29, 2020, the entire contents of which being incorporated herein by reference.

FIELD

The present exemplary embodiments relate to showerheads. It finds particular application in conjunction with a handheld shower and will be described with particular reference thereto. However, it is to be appreciated that the present exemplary embodiments are also amenable to other like applications.

BACKGROUND

Handheld showers and wands are popular for allowing a user more flexibility when showering. Typical handheld showers often include a bracket that is configured to support the handheld shower on or adjacent an outlet pipe when not being actively manipulated by a user. In one example, a handle of a handheld shower is configured to be received in a bracket that is mounted to the outlet pipe. A user can shower with the handheld shower supported in the bracket and serving as a conventional fixed showerhead or remove the handheld shower from the bracket for showering in a handheld mode.

Past handheld shower mounts have been difficult for users to operate, particularly when the user is in the midst of showering and wishes to switch between the fixed showerhead mode and the handheld shower mode. In many cases, proper alignment of the handheld shower with the bracket is not as easy as it could be when returning the handheld showerhead to the bracket. In other cases, a user may fail to properly or fully seat the handheld showerhead in the bracket resulting in the handheld showerhead drooping or coming free from the bracket.

Another issue that can arise with past handheld showers is the inadvertent dislodging of the handheld shower from its mount during showering. This can result in the handheld shower dropping to the floor of the shower and causing damage to the shower enclosure or handheld showerhead, or possibly impacting a user's foot. Handheld shower mounts that employ magnetic mounts or snap fit mounts are particularly prone to inadvertent dislodging as such designs do not generally provide a positive locking mechanism to secure the handheld shower in its mounted configuration.

BRIEF DESCRIPTION

Aspects of the present disclosure are directed to a handheld showerhead assembly including a handheld showerhead and a receiver to which the handheld showerhead is releasably securable. The handheld showerhead includes a push-button on a handle portion thereof for releasing the handheld showerhead from the receiver.

In accordance with one aspect, a handheld shower assembly comprises a handheld showerhead, a receiver mountable to an outlet pipe, and a coupling mechanism for releasably coupling the handheld shower with the receiver. The coupling mechanism includes a male component adapted to be received in a female component, the male component being associated with the receiver and the female component being associated with the handheld showerhead. The handheld showerhead includes a push-button release mechanism, and the coupling mechanism includes cooperating magnetic components for attracting the male component to the female component.

The push-button release mechanism can include a pair of jaws configured to engage a surface of the male component to restrict separation of the handheld showerhead from the receiver, the jaws being movable between a closed position and an open position, and/or a biasing member for biasing the pair of jaws towards the closed position. The push-button release mechanism can include a button supported for reciprocating movement by a handle portion of the handheld showerhead. A flow tube for supplying water can be supported in the handheld showerhead, and the flow tube can pass through an opening in the push-button release mechanism. The push-button release mechanism can include a first linkage having a pair of spaced-apart bars at least partially forming the opening through which the flow tube passes. The push-button release mechanism can be coextensive along a major portion of its length with the flow tube. The push-button release mechanism can include an arm supported in the hand-held showerhead for reciprocating movement in response to depression of the button. A rear surface of the button can be concave such that its shape corresponds to a shape of a surface of the flow tube, whereby the button is configured to engage the corresponding surface of the flow tube when fully depressed thereby limiting further depression of the button. The button can be on a front side of the handle portion of the handheld showerhead. wherein a rear surface of the button is concave such that its shape corresponds to a shape of a surface of the flow tube, whereby the button is configured to engage the corresponding surface of the flow tube when fully depressed thereby limiting further depression of the button. The handheld showerhead can include a plurality of nozzles, and the button can be on a front side of the handle portion of the handheld showerhead facing in a common direction as the plurality of nozzles.

In accordance with another aspect a handheld showerhead comprises a housing having a showerhead portion and a handle portion, and a female component configured to receive a male component of an associated receiver for releasably coupling the handheld showerhead with the associated receiver. The handheld showerhead includes a push-button release mechanism operative to permit or restrict disengagement of the female component from the male component of the associated receiver, and the coupling mechanism includes cooperating magnetic components for attracting the male component to the female component.

The push-button release mechanism can include a pair of jaws configured to engage a surface of the male component of the associated receiver to restrict separation of the handheld showerhead from the associated receiver, the jaws being movable between a closed position and an open position, and/or a biasing member for biasing the pair of jaws towards the closed position. The push-button release mechanism can include a button supported by the handle portion of the handheld showerhead. A flow tube can be supported in the housing of the handheld showerhead, and the flow tube can pass through an opening in the push-button release mechanism. The push-button release mechanism can include a first linkage having a pair of spaced-apart bars at least partially forming the opening through which the flow tube passes. The push-button release mechanism can be coextensive along a major portion of its length with the flow tube. The push-button release mechanism can include an arm supported in the housing of the hand-held showerhead for reciprocating movement in response to depression of the button. A rear surface of the button can be concave such that its shape corresponds to a shape of a surface of the flow tube, whereby the button can be configured to engage the corresponding surface of the flow tube when fully depressed thereby limiting further depression of the button. The button can be on a front side of the handle portion of the handheld showerhead. The handheld showerhead can include a plurality of nozzles, and the button can be on a front side of the handle portion of the handheld showerhead facing in a common direction as the plurality of nozzles.

DETAILED DESCRIPTION

Figure 1:
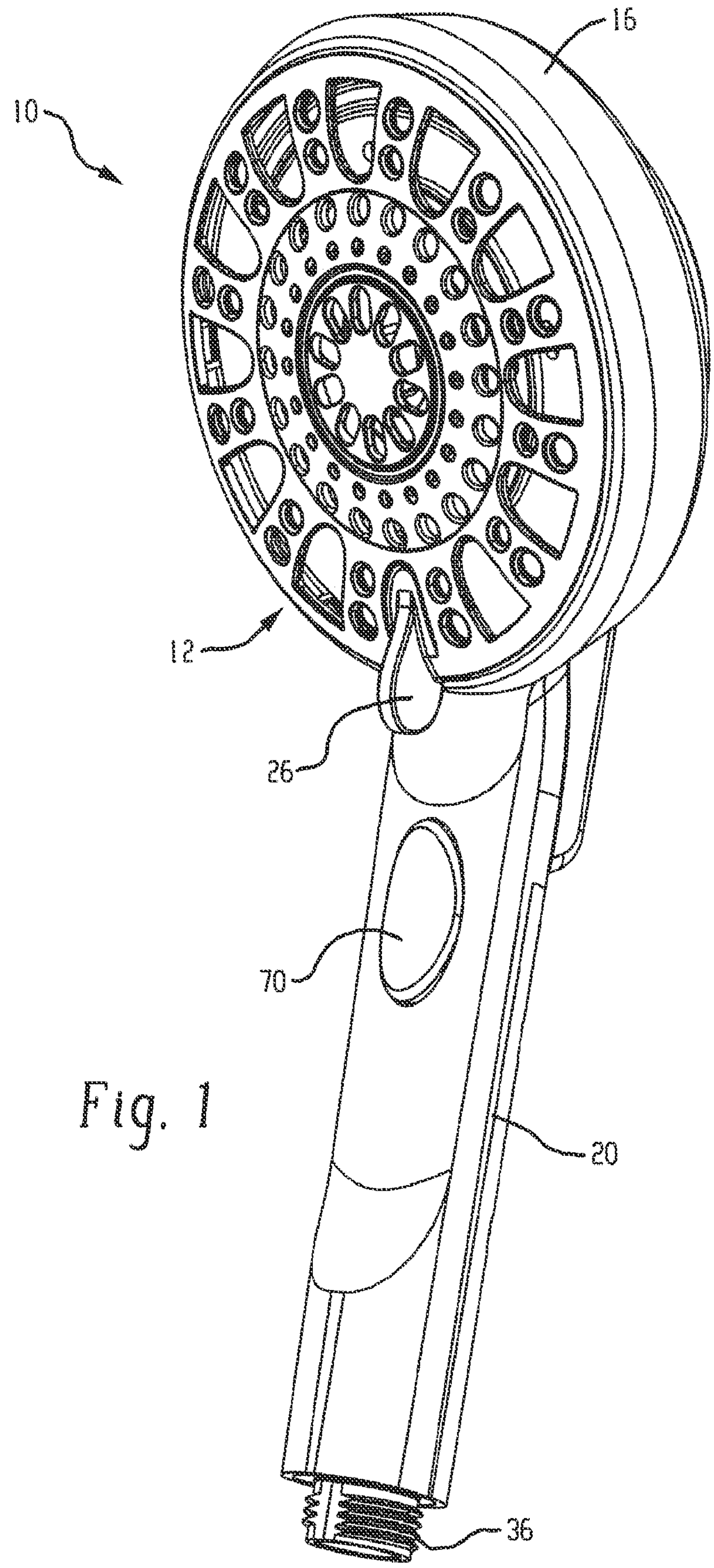
FIG. 1 is a perspective view of an exemplary showerhead in accordance with the present disclosure.
Figure 4:
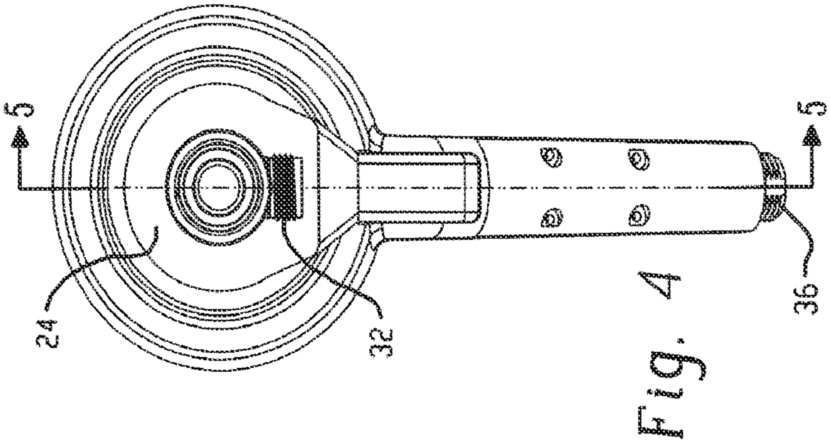
FIG. 4 is a rear elevation view of the showerhead of FIG. 1.
Figure 3:
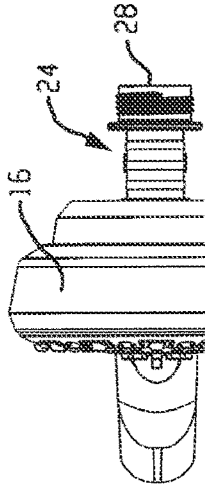
FIG. 3 is a top view of the showerhead of FIG. 1.

Referring now to the drawings in detail, and initially to FIGS. 1-4, an exemplary handheld shower/wand assembly is illustrated and identified generally by reference numeral 10. The handheld shower assembly 10 includes a handheld showerhead 12 having a showerhead portion 16 and a handle portion 20. The handheld showerhead 12 is removably coupled with a receiver 24, which is configured to be mounted to a water supply pipe (not shown) for a shower or the like for positioning the handheld showerhead 12 for directing water on a user. The handheld showerhead 12 can have an adjustable showerhead that provides multiple different types of flow from the showerhead which may be selected by rotation of a selector 26 which functions to block or permit flow through one or more sets of nozzles (not shown) on the face of the showerhead portion 16. It will be appreciated that the configuration of the nozzles and other features of the handheld showerhead 12 are exemplary in nature, and that aspects of the present disclosure are applicable to a wide variety of handheld showerheads.

The receiver 24 generally includes an inlet 28 adapted to be threadedly secured to the supply pipe and an outlet 32 for supplying water from the supply pipe to the handheld showerhead 12. Although not shown in the drawings, outlet 32 is typically attached to a supply hose that connects outlet 32 to an inlet 36 of the handheld showerhead 12. In this manner, the water supplied by the supply pipe can flow through the receiver 24 to the handheld showerhead 12.

Figure 5:
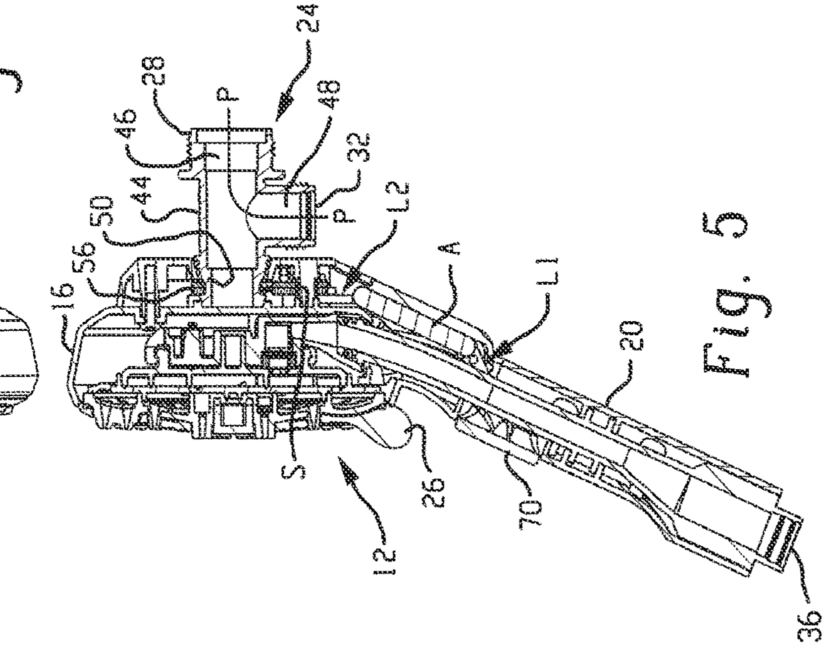
FIG. 5 is a cross-sectional view taken along the line 5-5 in FIG. 4.
Figure 2:
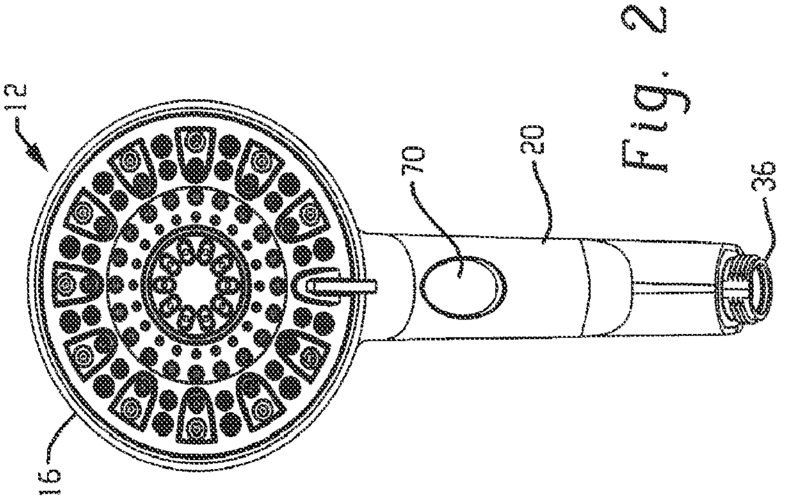
FIG. 2 is a front elevation view of the showerhead of FIG. 1.
Figure 6:
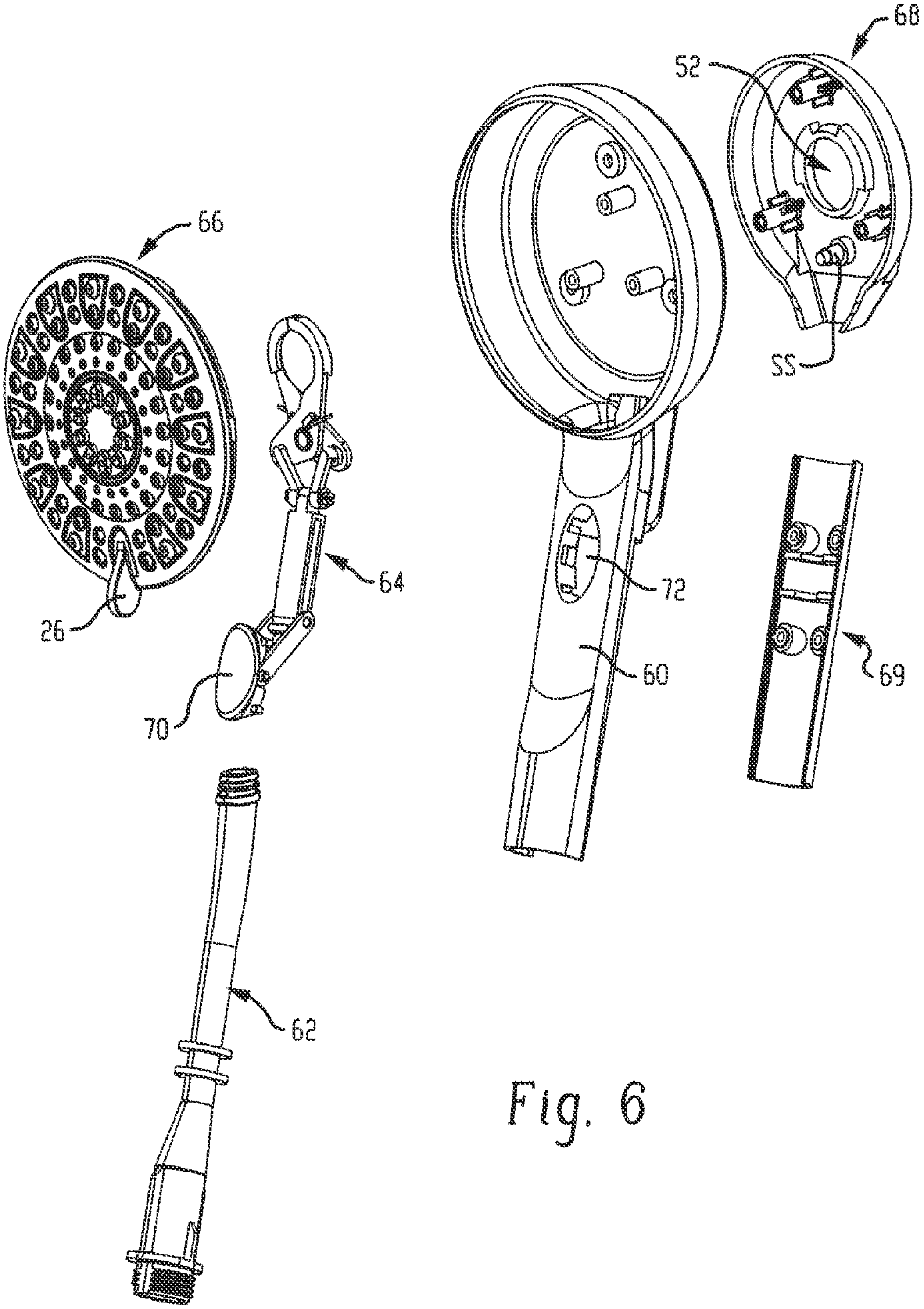
FIG. 6 is an exploded view of the showerhead of FIG. 1.

Turning now to FIG. 5, the internal details of the handheld showerhead 12 and the receiver 24 of the shower assembly 10 will be described. The receiver 24 includes a receiver body 44 having a flow passageway indicated by the line labelled P that extends internally between the inlet 28 and the outlet 32. The flow passageway P is formed by intersecting bores 46/48 within the receiver body 44, which in this embodiment extend at right angles to each other. In some embodiments, the receiver 24 can be integrated in a diverter or other valve assembly configured to divert water between one or more showerheads. In other embodiments, the receiver 24 can be a separate unit mountable to any desired surface (e.g., a shower wall, a shower door, etc.), and may or may not include flow passageways for supplying water to the handheld showerhead 12. In the exemplary embodiment, the receiver 24 includes a protrusion 50 (e.g., male component). The protrusion 50 is configured to be received in a recess of the showerhead 12 for supporting the showerhead 12, as will now be described in connection with the remaining FIGURES.

Turning to FIGS. 6-12, the handheld showerhead 12 is releasably couplable to the receiver 24 by a coupling mechanism that generally includes a male portion, protrusion 50 (associated with the receiver 24), that is configured to be received in a female portion, recess 52 (associated with the showerhead 12). The protrusion 50 has an annular recess 56 that extends circumferentially about an outer diameter of the protrusion 50. In the illustrated embodiment, the protrusion 56 is tapered along its axial length from a larger diameter proximal end to a smaller diameter distal end.

The showerhead 12 of the exemplary embodiment is assembled from several components including a main showerhead body 60, a flow tube 62, a push-button release mechanism 64, a front face 66 having a plurality of nozzles, a rear cover 68 and a rear handle portion cover 69. The push-button release mechanism 64 includes a push-button 70. As will be described below, the push-button 70 is configured to release the showerhead 12 from the receiver 24 when depressed by a user.

Figure 7:
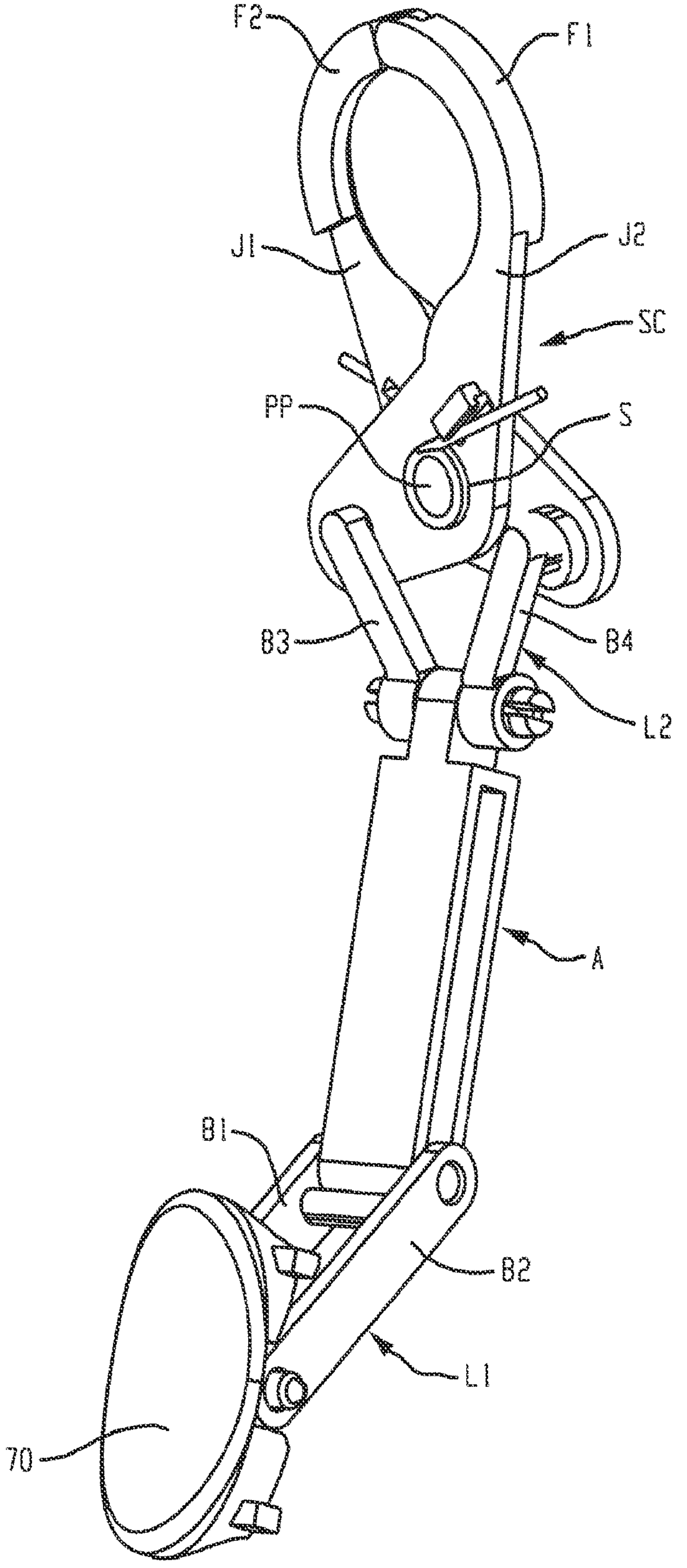
FIG. 7 is a perspective view of the push-button release mechanism in a closed configuration.

Referring back to FIG. 6, the push-button release mechanism 64 and flow tube 62 are supported in the main showerhead body 60. The push-button 70 of the push-button release mechanism 64 is at least partially received in an aperture 72 of the main showerhead body 60 such that the push-button 70 can be actuated by a user. The push-button 70 is coupled to a first linkage L1. Linkage L1 includes spaced-apart bars B1 and B2 that are pivotally connected at first ends thereof to the push-button 70 and pivotally connected at second ends thereof to a first end of an arm A. The flow tube 62 extends through an opening 76 between the spaced-apart bars B1 and B2 of the first linkage L1. A rear surface 80 of the push-button 70 is arcuate such that its shape corresponds to the shape of the flow tube 62. As such, the flow tube 62 serves as a stop against which the push-button 70 bottoms when fully depressed. A second end of arm A is pivotally connected to a second linkage L2. Linkage L2 includes first and second bars B3 and B4. A scissor clamp SC includes a first jaw J1 and a second jaw J2 pivotally joined together at pivot point P. A first end of each jaw J1 and J2 is pivotally attached to a respective bar B3 and B4. A second end of each jaw J1 and J2 includes a flange F1 and F2 adapted to engage the protrusion 50 of the receiver 24 and, in particular, the flanges F1 and F2 are configured to be received in the annular groove 56 of the protrusion 50. A torsion spring S biases the second end of each of jaws J1 and J2 towards each other. In the illustrated embodiment, the coil portion CP of the torsion spring S is supported on a spring support SS of the rear cover 68 (FIG. 6) and serves as an axle about which the jaws J1 and J2 are supported for rotation, with each leg of the torsion spring acting on a respective jaw J1 and J2 to bias the flanges F1 and F2 towards each other (e.g., biased closed), as best seen in FIG. 7.

Figure 8:
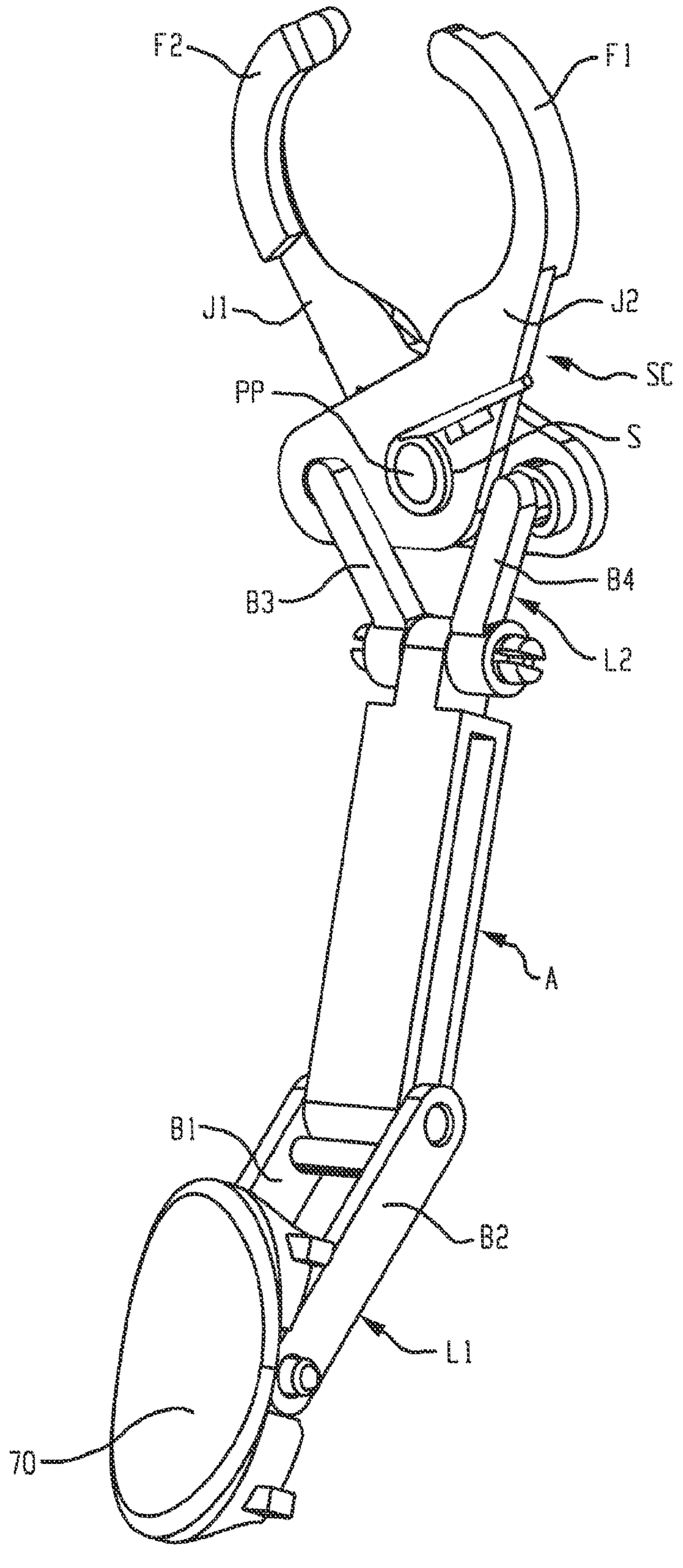
FIG. 8 is a perspective view of the push-button release mechanism in an open configuration.
Figure 10:
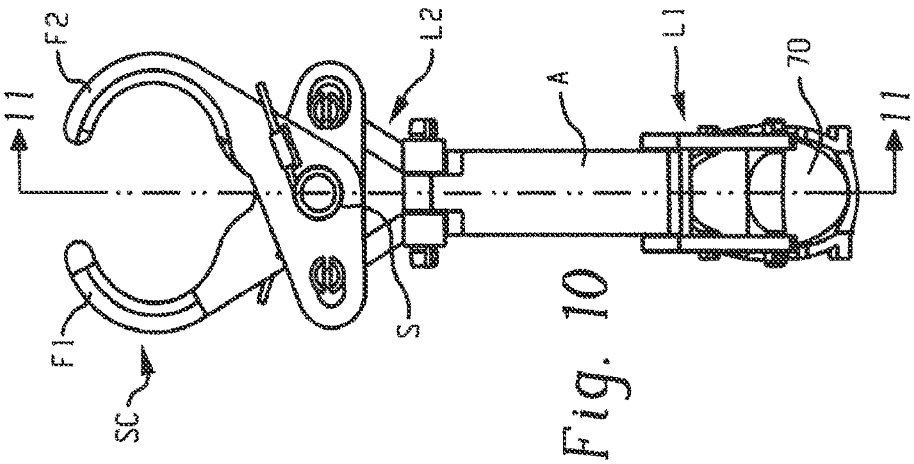
FIG. 10 is a rear elevation view of the push-button release mechanism of FIG. 8.
Figure 12:
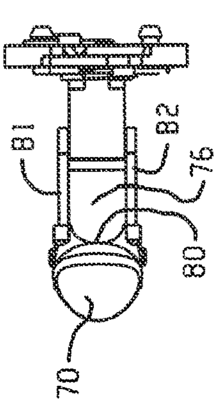
FIG. 12 is a bottom view of the push-button release mechanism of FIG. 8.
Figure 11:
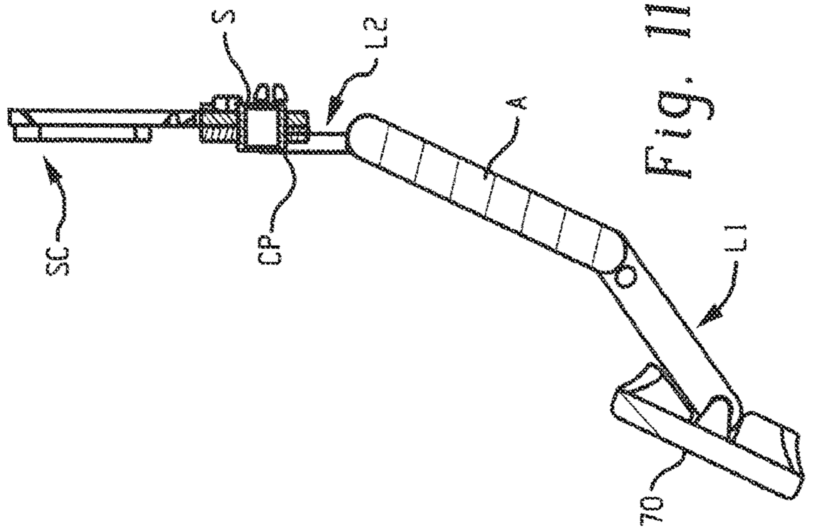
FIG. 11 is a cross-sectional view taken along the line 11-11 in FIG. 10.
Figure 9:
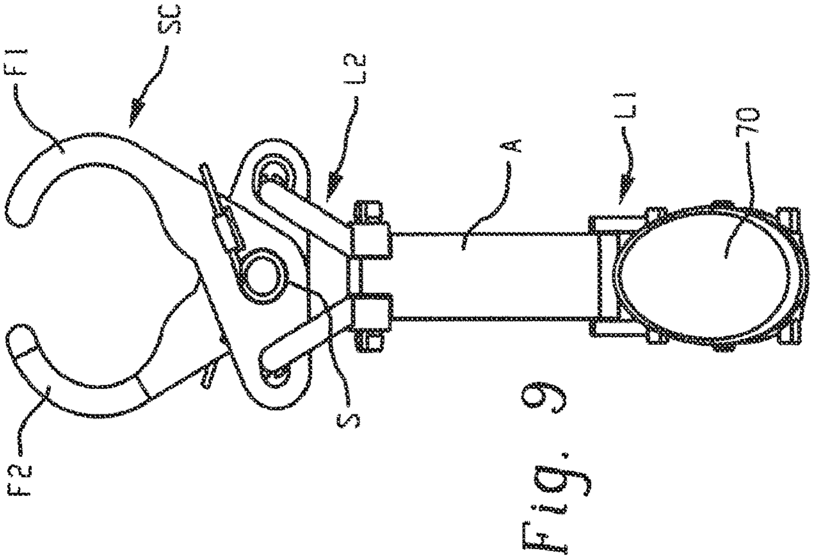
FIG. 9 is a front elevation view of the of the push-button release mechanism of FIG. 8.

As supported within the main showerhead body 60, the arm A of the push-button release mechanism 64 is constrained for axial reciprocating movement along a longitudinal axis of the handle portion 20 of the showerhead 12 when the push-button 70 is depressed. With reference to FIGS. 7 and 8, wherein the push-button mechanism 64 is shown in closed state in FIG. 7 and an open state (e.g., release position) in FIG. 8, it will be appreciated that the depression of the push-button 70 from the position of FIG. 7 to the position of FIG. 8 results in the arm A shifting within the main showerhead body 60 of the showerhead 12 towards the showerhead portion 16 such that bars B3 and B4 actuate the scissor clamp SC to spread the flanges F1 and F2 apart to the position shown in FIG. 8 (e.g., a release position). Upon release of the push-button 70, the torsion spring S returns the scissor clamp SC to the position of FIG. 7. Likewise, the push-button 70 is restored to its undepressed position, for example as shown in FIG. 1.

It should be appreciated that the distal ends of the flanges F1 and F2 include mating profiles such that, when in the closed state, the jaws J1 and J2 engage each other in overlapping fashion. This feature increases the rigidity of the scissor clamp SC for resisting forced separation of showerhead 12 from the receiver 24 (e.g., separation without depression of button 70).

In use, it should be understood that a user will typically grasp the handle portion 20 of the showerhead 12 for removal from the receiver 24. The button 70 is positioned on the handle portion 20 such that the user's thumb will typically naturally fall on the button 70 when the handle portion 20 is grasped. As the user attempts to pull the handheld showerhead 12 away from the receiver 24, depression of the button 70 is intuitive as the position of the button 70 is such that the user may naturally apply force to the button 70 as the handheld showerhead 12 is pulled away from the receiver 24.

When the user wishes to return the handheld showerhead 12 to the receiver, the user simply orients the handheld showerhead such that the protrusion 50 of the receiver 24 is aligned with the recess 52 of the handheld showerhead 12, and applied force to the handheld showerhead 12 to seat the protrusion 50 in the recess 52. The tapered leading end of the protrusion 50 urges the jaws J1 and J2 apart allowing the flanges to settle in the annular groove 56 of the protrusion 50 where they are maintained by the spring S, thereby positively securing the handheld showerhead 12 to the receiver 24.

In the illustrated embodiments, it should be appreciated that the passageway P in the receiver is optional. Accordingly, embodiments are contemplated wherein the passageway P is not present.

Figure 14:
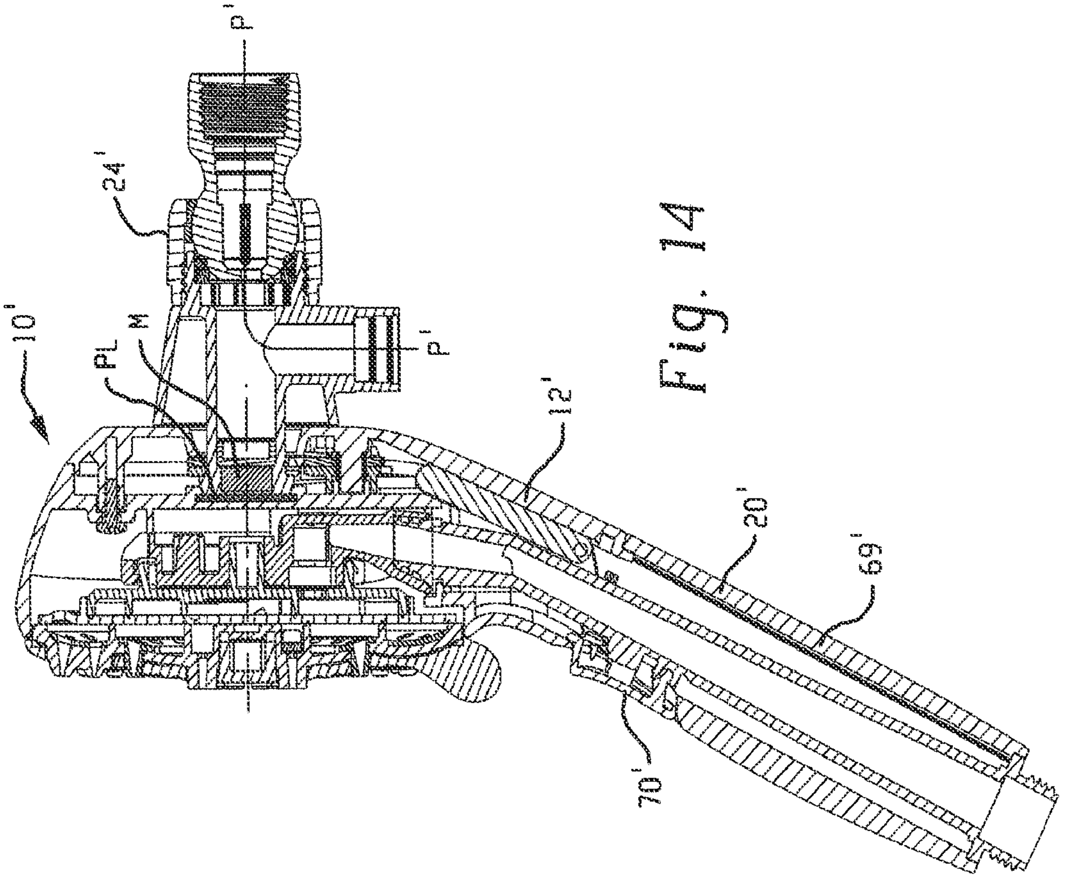
FIG. 14 is a cross-sectional view of the showerhead taken along the line 14-14 in FIG. 13.
Figure 13:
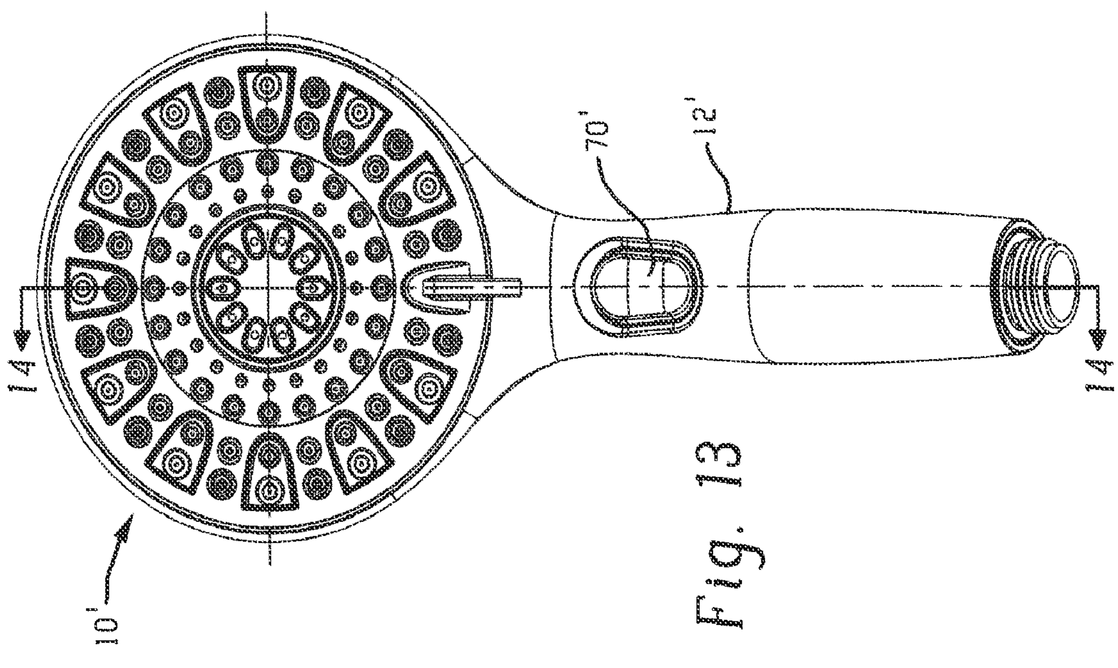
FIG. 13 is a front elevation view of another exemplary showerhead in accordance with the present disclosure.
Figure 15:
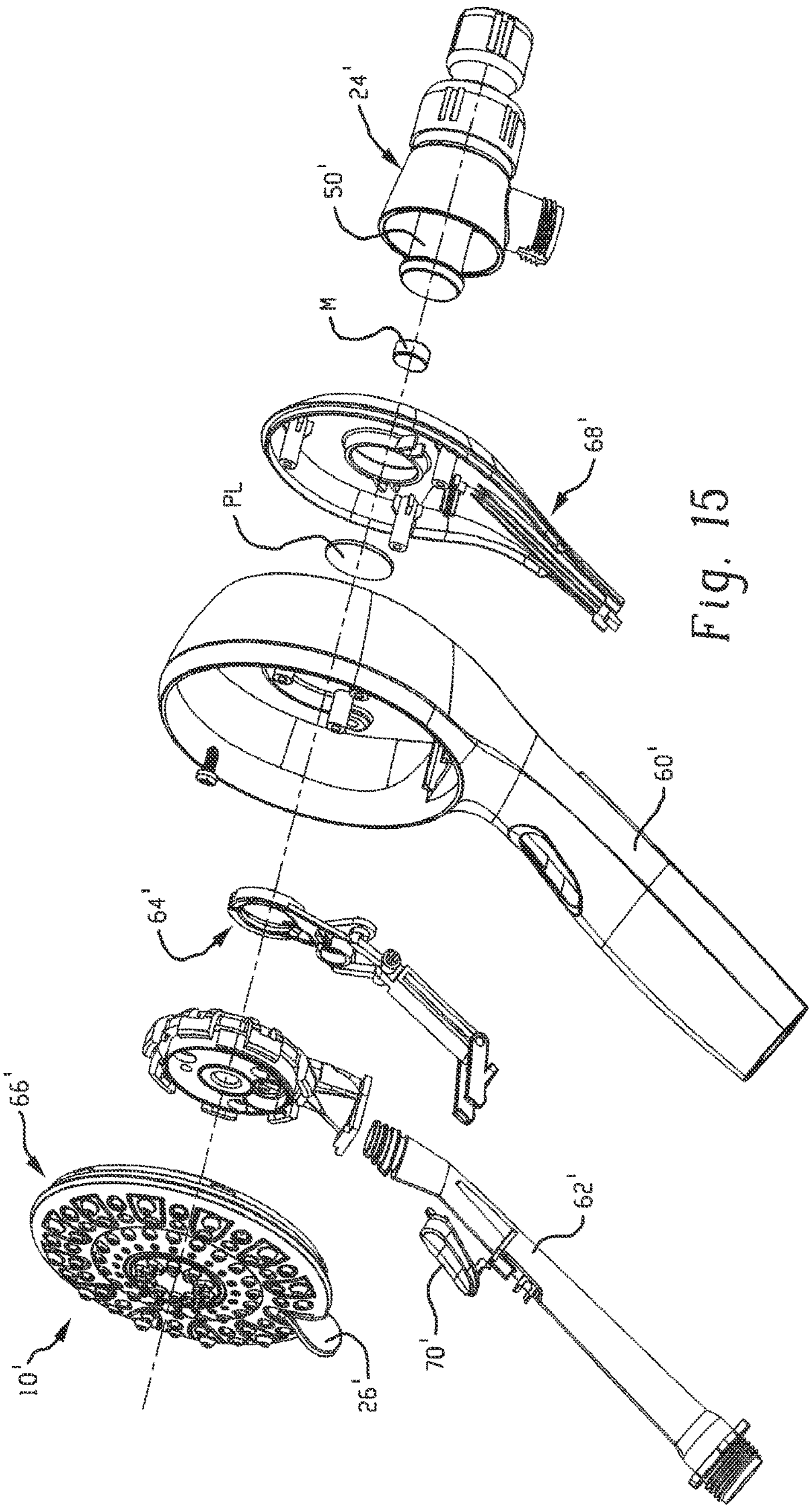
FIG. 15 is an exploded view of the showerhead of FIG. 13.

Turning to FIGS. 13-15, another exemplary embodiment of a showerhead assembly in accordance with the present disclosure is illustrated and identified by reference numeral 10'. It will be appreciated that the showerhead assembly 10' is similar to the showerhead 10 except where noted in the following paragraphs. Accordingly, the reference numerals of common components are denoted by a "prime" in the drawings and description of the showerhead 10'. To the extent any primed reference numeral appears in the drawings but not in the text of the specification, it will be appreciated that such primed reference numerals correspond to the unprimed reference numerals of the embodiment of FIGS. 1-12.

Like the showerhead 10 of FIGS. 1-12, the showerhead assembly 10' includes a showerhead 12' and a receiver 24'. The showerhead 12' of the exemplary embodiment is assembled from several components including a main showerhead body 60', a flow tube 62', a push-button release mechanism 64', a front face 66' having a plurality of nozzles, a rear cover 68' and a rear handle portion cover 69'. The push-button release mechanism 64' includes a push-button 70'. The push-button 70' is configured to release the showerhead 12' from the receiver 24' when depressed by a user in the same manner as the push-button 70 of showerhead 12 described above. It should be appreciated that, although not identical in appearance, the showerhead 12' and receiver 24' generally include all of the components of the showerhead 12 and receiver 24 shown and described in connection with FIG. 1-12.

The showerhead assembly 10' differs from the showerhead assembly 10 in that a magnetic guide feature is provided for assisting alignment of the shower head 12' with the receiver 24' The magnetic guide feature includes magnetic components in the showerhead 12' and the receiver 24' that function to align the showerhead 12' with the receiver 24' as the showerhead 12' is brought into proximity with the receiver 24'.

The magnetic components in the illustrated embodiment include a magnet M supported in the receiver 24' and a ferromagnetic plate PL supported in the showerhead 12'. As will be appreciated other arrangements of magnetic components can be employed including using a pair of magnets of opposite polarity. In one embodiment, the magnetic components exert a force in a coupling direction that is sufficient to be felt by a user, but of a magnitude that is not sufficient to couple the showerhead 12' to the receiver 24'. In another embodiment, the magnetic components exert a force in a coupling direction that is sufficient to maintain the showerhead 12' in a coupled configuration with the receiver 24'. In still another embodiment, the magnetic components can be of a common polarity, such that a repelling force is present between the showerhead 12' and the receiver 24'. In this configuration, the repelling force helps to separate the showerhead 12' from the receiver 24'.

In the illustrated embodiment, the magnet M is supported in the protrusion 50' of the receiver 24'. In other embodiments, the magnet M can be supported on an exterior of the protrusion 50' or the protrusion 50' or terminal end portion thereof can be made of a magnetic material. The plate PL is supported by the body of the showerhead 12'. The plate PL has a diameter that is greater than the diameter of the magnet M. In the illustrated embodiment, the plate diameter is approximately twice the diameter of the magnet M. It should be appreciated that existing showerheads can be retrofitted with magnets or magnetic components to work with the receiver 24'. In this regard, magnets can be secured to the showerhead with adhesive and/or tape.

In the exemplary illustrated embodiments, the push-button release mechanism 64 is generally coextensive with and parallel to the flow tube 62. As noted, the flow tube 64 extends through an opening 76 in the first linkage L1 such that the push-button 70 is on a first side of the flow tube 64 and the arm A, second linkage L2, and scissor clamp SC are on an opposite side of the flow tube 64. This configuration provides a more compact arrangement such that the handle portion 20 of the showerhead 12 need not necessarily be enlarged to accommodate the release mechanism.

It will be appreciated that the push-button 70 of the push-button release mechanism 64 of the exemplary embodiments of FIGS. 1-15 is operatively connected to arm A such the depression of the push-button 70 results in linear movement of arm A and, consequently, opening and closing of the scissor clamp SC. As such, a variety of alternative actuating mechanisms can be used in place of the push-button 70 to reciprocate arm A and/or manipulate the scissor clamp SC directly to effect opening and closing of the scissor clamp SC.

Figure 16:
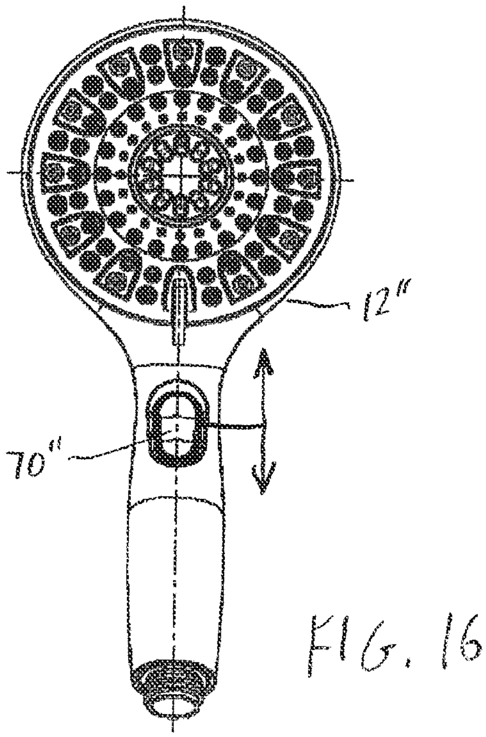
FIG. 16 is a front elevation view of another exemplary showerhead in accordance with the present disclosure.
Figure 17:
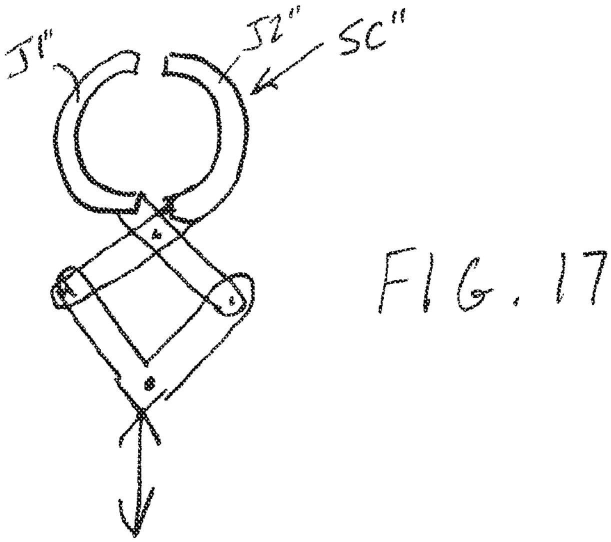
FIG. 17 is a plan view of an exemplary scissor clamp.
Figure 18:
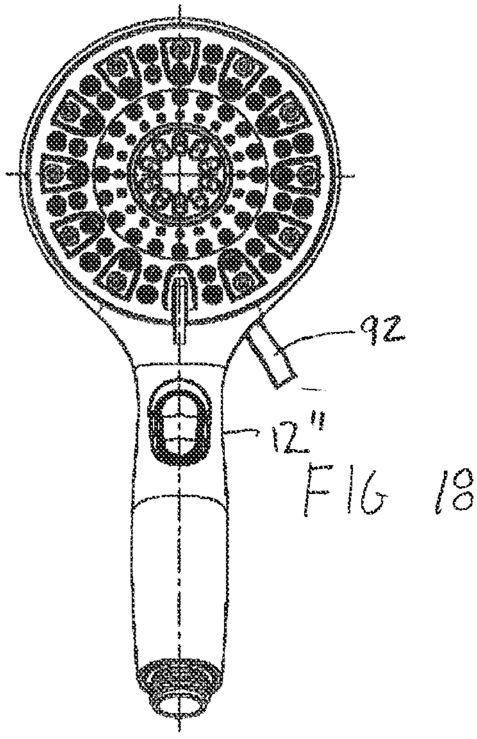
FIG. 18 is a front elevation view of another exemplary showerhead in accordance with the present disclosure.
Figure 19:
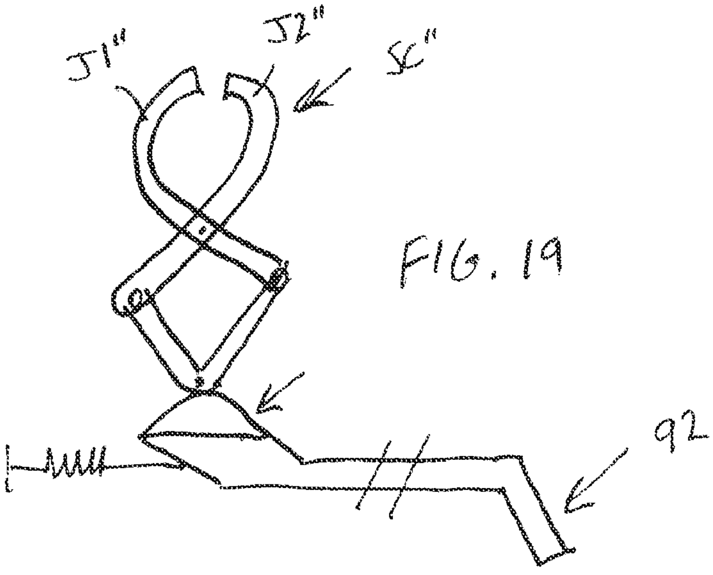
FIG. 19 is a plan view of an exemplary scissor clamp.

With reference to the remaining FIGURES, a showerhead 12" is shown having a plurality of different actuation mechanisms for manipulating a release mechanism 64" to effect opening and closing of a scissor clamp SC". For example, FIGS. 16 and 17 illustrate an exemplary showerhead 12" having a sliding button 70" instead of a push-button. The sliding button 70" is operatively coupled to the release mechanism 64" such that sliding movement (up/down and/or left/right) of the sliding button 70" moves respective jaws J1" and J2" of the scissor clamp SC" between respective open and closed positions. FIGS. 18 and 19 illustrate an exemplary showerhead 12" having a trigger 92 instead of a push-button. The trigger 92 is operatively coupled to the release mechanism 64" such that movement of the trigger 92 moves respective jaws J1" and J2" of the scissor clamp SC" between respective open and closed positions. The trigger 92 can be biased by a spring 94 or the like towards a position such that the scissor clamp SC" is closed. In still other embodiments, a rotary dial can be provided on a handle portion or a showerhead portion of a showerhead for actuating the scissor clamp SC". Such rotary dial can be configured to reciprocate the scissor clamp SC" between and closed positions upon clockwise/counterclockwise rotation of the rotary dial. In yet another embodiment, a push-button can be provided on the showerhead portion of the showerhead. The push button can be spring-loaded and, upon depression of the push-button, the scissor clamp SC" is moved to an open position. Upon release of the push-button, the scissor clamp SC" returns to a closed position. The push-button can have a catch to hold the push-button in a depressed position to thereby maintain the scissor clamp SC" in an open position. A subsequent depression of the push-button then permits the push-button to return to its original, undepressed state and the scissor clamp SC" to return to a closed position. In still other embodiments, a toggle switch can be provided on a surface of the shower head or receiver for releasing/securing the showerhead to the receiver.

In any of the exemplary embodiments, it should be appreciated that the push-button, sliding button, trigger, dial or other actuating mechanism can be located in virtually any position on the showerhead. In some embodiments, the actuating mechanism can be on a front surface or a back surface of the showerhead. In other embodiments, the actuating mechanism can be located on a side surface, a bottom surface, or a top surface of the showerhead. The actuating mechanism can be provided on a handle portion or a showerhead portion of the showerhead, or both. In still other embodiments, more than one actuating mechanism can be provided, such as a first push-button on a front surface of the showerhead and a second push-button on a back surface of the showerhead. Multiple types of actuating mechanisms can be provided on the same showerhead. For example, a push-button can be provided on a front surface of the showerhead and a sliding button can be provided on a back surface of the showerhead.

It is further contemplated that certain actuating mechanisms of the present disclosure can be configured to perform more than one function. For example, the release push-button, sliding button, trigger, dial or other actuating mechanism can be configured to not only actuate the release mechanism but also to effect a pause function of the showerhead and/or to select a shower output mode (e.g., one or more of multiple banks of nozzles having different spray patterns or styles). For example, a dial can be configured to be rotated to release the showerhead, and also to be depressed to effect a pause function, or vice versa.

Figure 20:
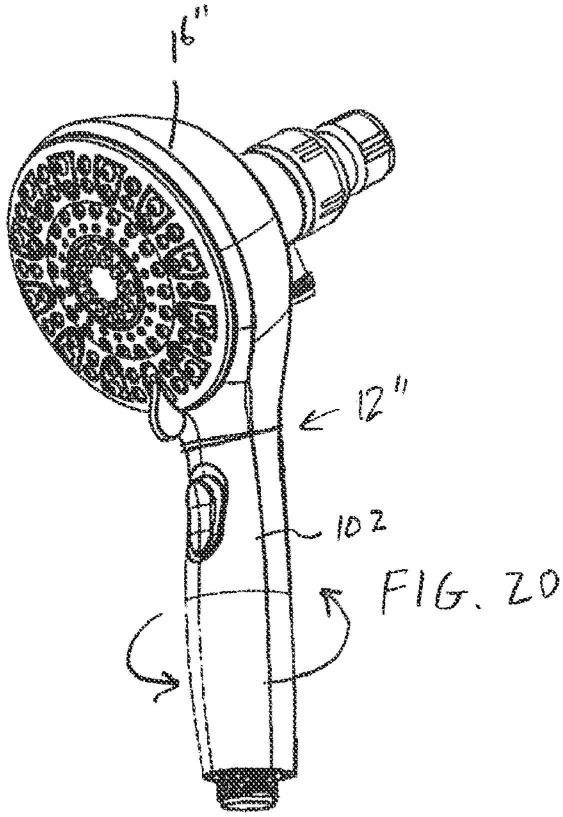
FIG. 20 is a perspective view of another exemplary showerhead in accordance with the present disclosure.
Figure 21:
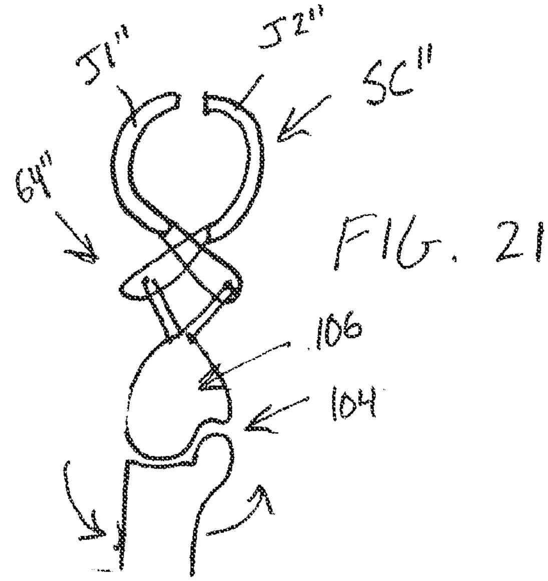
FIG. 21 is a plan view of an exemplary scissor clamp and cam mechanism.

Turning to FIGS. 20 and 21, a showerhead 12" is illustrated with a twist-to-release handle 102. In this embodiment, the handle 102 can be rotated relative to the showerhead portion 16" of the showerhead 12". The handle 102 is operatively coupled to the release mechanism 64" such that rotation of handle 102 in a first direction moves respective jaws J1" and J2" of the scissor clamp SC" to an open position, and return rotation of the handle 102 in a second direction moves respective jaws J1" and J2" of the scissor clamp SC" to a closed position. To this end, the handle 102 is configured to rotate a cam 104. A cam follower 106 is coupled to the scissor clamp SC". Rotation of the cam 104 by the handle 102 results in upward movement of the cam follower 106 and, consequently, opening of the jaws J1" and J2".

In still other embodiments, the showerhead can be configured to be released from the receiver by rotation or tilting of the showerhead in one or more directions. For example, the showerhead can be configured to release from the receiver upon quarter-turn rotation of the showerhead in the clockwise and/or counterclockwise directions. In another configuration, the showerhead can be tilted up or down to effect release.

Figure 22:
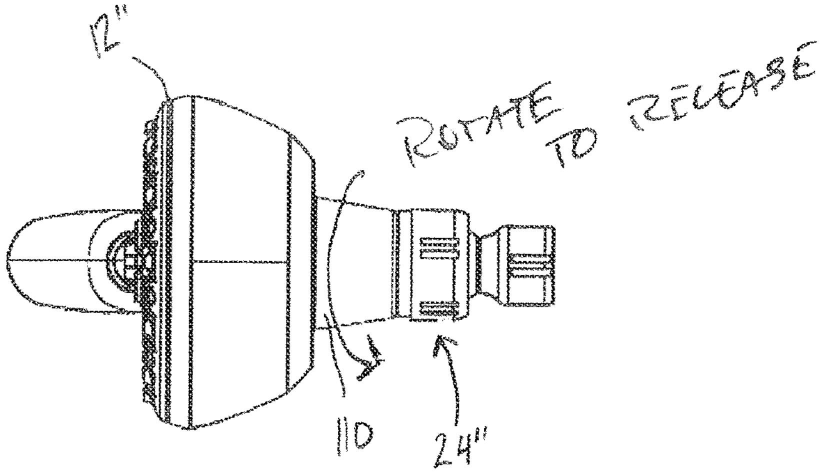
FIG. 22 is a top view of another exemplary showerhead assembly in accordance with the present disclosure.

While the foregoing embodiments have focused on release mechanisms in the showerhead portion of a showerhead assembly, it should be appreciated that release mechanisms can also be provided in a receiver portion of a showerhead assembly. For example, a receiver can be provided with various coupling/release mechanisms such as a bayonet style coupling wherein the handheld showerhead is inserted axially and then rotated relative to the receiver to coupled position. In other configurations, a scissor clamp can be mounted in female portion of the receiver adapted to receive a male portion of the handheld showerhead (e.g., position of the male and female components reversed). An actuating mechanism, such as a push-button, sliding button, trigger, dial etc. can be located on the receiver. In another arrangement, and with reference to FIG. 22, a portion 110 of the housing of the receiver 24" can be rotated to release to the handheld showerhead from the receiver.

Figure 23:
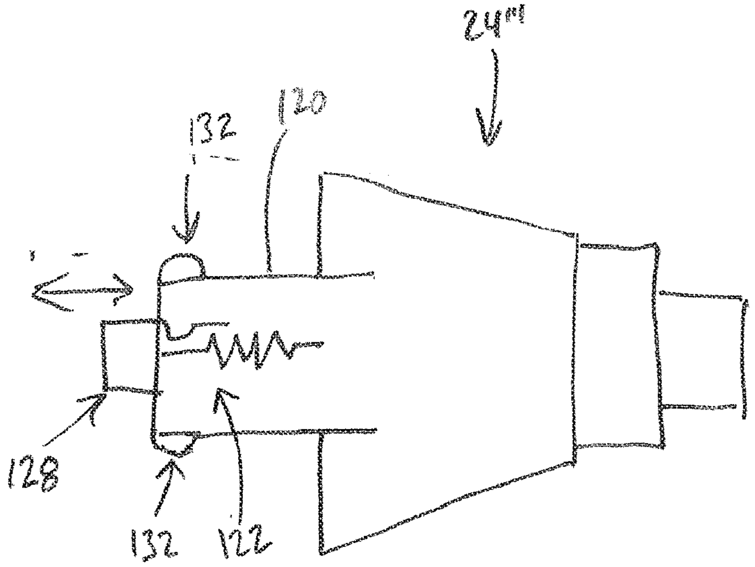
FIG. 23 is a schematic diagram of an exemplary push-to-release coupling in accordance with the present disclosure.

FIG. 23 illustrates a receiver 24'" comprising a male portion 120 having a push-to-release quick connect coupling half 122 adapted to receive a female coupling half associated with a showerhead (not shown). The coupling half 122 includes a plunger 128 that is operative to lock and release balls 132. Balls 132 are supported circumferentially about the male portion 120 for reciprocating radial movement into and out of an annular groove in the female coupling half. When the showerhead is first placed on the receiver 24'", the plunger 128 is depressed a first time thereby locking the balls 132 in a radially outward position within the annular groove of the female coupling half. A subsequent depression of the showerhead depresses the plunger 128 a second time thereby releasing the balls 132 such that the showerhead can be removed from the receiver 24'". The push-to-release quick connect coupling half 122 is thus alternately locked and unlocked upon successive depressions of the plunger. In use, the showerhead is coupled to the receiver 24'" by pressing the showerhead onto the receiver 24'" and the showerhead is decoupled from the receiver 24'" by a second pressing of the showerhead onto the receiver 24".

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A handheld shower assembly comprising: a handheld showerhead; a receiver mountable to an outlet pipe; and a coupling mechanism for releasably coupling the handheld shower with the receiver; wherein the coupling mechanism includes a male component adapted to be received in a female component, the male component being associated with the receiver and the female component being associated with the handheld showerhead; wherein the handheld showerhead includes a user-actuated release mechanism; and wherein the coupling mechanism includes cooperating magnetic components for attracting the male component to the female component;

wherein the user-actuated release mechanism includes a biasing member and a pair of jaws, the pair of jaws configured to engage a surface of the male component to restrict separation of the handheld showerhead from the receiver, the jaws being movable between a closed position and an open position, and the biasing member biases the pair of jaws towards the closed position;

wherein a flow tube passes through an opening in the user-actuated release mechanism; and wherein the user-actuated release mechanism includes a first linkage having a pair of pivotably spaced-apart bars at least partially forming the opening through which the flow tube passes.

2. The handheld shower assembly of claim 1, wherein the user-actuated release mechanism comprises a push button supported by a handle portion of the handheld showerhead.

3. The handheld shower assembly of claim 2, wherein the flow tube is supported in the handheld showerhead.

4. The handheld shower assembly of claim 1, wherein the user-actuated release mechanism comprises a push-button release mechanism which is coextensive along a major portion of its length with the flow tube, the push button release mechanism comprising a push button.

5. The handheld shower assembly of claim 4, wherein the push-button release mechanism includes an arm supported in the handheld showerhead for reciprocating movement in response to depression of the push button.

6. The handheld shower assembly of claim 5, wherein the push button has a rear surface which is concave such that its shape corresponds to a shape of a surface of the flow tube, whereby the push button is configured to engage the corresponding surface of the flow tube when fully depressed thereby limiting further depression of the push button.

7. The handheld shower assembly of claim 1, wherein the user-actuated release mechanism comprises one of a push button, a sliding button, a trigger and a rotary dial.

* * * * *